(12) United States Patent
Kanno et al.

(10) Patent No.: US 7,449,157 B2
(45) Date of Patent: Nov. 11, 2008

(54) CATALYTIC EXHAUST GAS DECOMPOSITION APPARATUS AND EXHAUST GAS DECOMPOSITION METHOD

(75) Inventors: Shuichi Kanno, Hitachi (JP); Shin Tamata, Higashiibaraki-gun (JP); Kazuyoshi Irie, Hitachi (JP); Kenji Yamamoto, Hitachinaka (JP); Masayuki Taniguchi, Hitachinaka (JP); Osamu Ito, Hitachiohta (JP); Hironobu Kobayashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 11/270,550

(22) Filed: Nov. 10, 2005

(65) Prior Publication Data
US 2006/0062705 A1 Mar. 23, 2006

Related U.S. Application Data
(63) Continuation of application No. 10/684,375, filed on Oct. 15, 2003, now Pat. No. 7,033,550.

(30) Foreign Application Priority Data
Apr. 16, 2003 (JP) .............................. 2003-110980

(51) Int. Cl.
*F01N 3/08* (2006.01)
(52) U.S. Cl. ..................................... 422/176

(58) Field of Classification Search ................. 422/171, 422/176, 177; 588/312, 406; 181/244
See application file for complete search history.

(56) References Cited

U.S. PATENT DOCUMENTS
3,374,857 A * 3/1968 Hutchins .................... 181/244
4,039,294 A * 8/1977 Mayer et al. ................. 422/171

FOREIGN PATENT DOCUMENTS
JP 07-185259 7/1995

* cited by examiner

*Primary Examiner*—Tom Duong
(74) *Attorney, Agent, or Firm*—Mattingly, Stanger, Malur & Brundidge, P.C.

(57) ABSTRACT

A catalytic exhaust gas decomposition spirals an exhaust gas containing therein a substance to be decomposed and a reactant gas, rectifies the spiral flow, and lets the substance to be decomposed react with the reactant gas after the spiral flow has been rectified. For rectifying the spiral flow of the exhaust gas and the reactant gas, a plate-like baffle wall has therein a through hole at a portion near its center. The spiral flow is allowed to pass through the through hole so as to be centralized temporarily. The spiral flow then passes through an enlarged section of a flow path downstream of the through hole before being introduced into the catalyst bed. The method helps minimize variations in gas velocity of the exhaust gas flowing into the catalyst bed, thereby allowing a desired decomposition rate to be obtained substantially consistently.

9 Claims, 5 Drawing Sheets

CATALYTIC EXHAUST GAS DECOMPOSITION APPARATUS AND EXHAUST GAS DECOMPOSITION METHOD

BACKGROUND OF THE INVENTION

This is a continuation application of U.S. Ser. No. 10/684,375, filed Oct. 15, 2003, now U.S. Pat. No. 7,033,550.

The present invention relates to a catalytic exhaust gas decomposition apparatus and exhaust gas decomposition method for decomposing exhaust gases using a catalyst. The present invention relates also to an exhaust gas decomposition apparatus for decomposing PFC (perfluorocompounds).

As an example of an exhaust gas decomposition apparatus for decomposing exhaust gases using a catalyst, it is known that a spiral flow of an exhaust gas and a reactant gas is formed, allowed to pass through a baffle pipe for rectification, and is then introduced into a catalytic reactor (for example, see Japanese Patent Laid-open No. 7-185259 (claim 1, FIGS. 1 and 2)).

Japanese Patent Laid-open No. 7-185259 discloses an exhaust gas decomposition apparatus, in which a silane exhaust gas discharged out of a semiconductor processing reactor is diluted with a nitrogen gas, reacted with air, and led to a particle filter and introduced into a catalytic reactor. This exhaust gas decomposition apparatus is provided with a spiral flow generator that forms a spiral flow of the silane exhaust gas and air, a spiral flow reactor, and a baffle pipe. The apparatus is further provided in a later stage thereof with the particle filter and the catalytic reactor.

In catalytic exhaust gas decomposition, it is desirable that exhaust gases be introduced to a catalyst bed with a velocity distribution as uniform as possible.

The aforementioned prior art is intended to extend the service life of the particle filter and catalytic reactor, not concerned with a means of making the velocity distribution of exhaust gases as uniform as possible.

SUMMARY OF THE INVENTION

It is therefore an object of the present invention to suppress variations in gas velocity distribution of the exhaust gas and reactant gas introduced to the catalyst bed.

To achieve the foregoing object, a catalytic exhaust gas decomposition apparatus or method according to one preferred embodiment of the present invention spirals an exhaust gas containing therein a substance to be decomposed and a reactant gas, rectifies the spiral flow, and introduces the spiral flow rectified to a catalyst bed for reaction between the substance to be decomposed and the reactant gas. This arrangement is characterized in that, as a means for rectifying the spiral flow of the exhaust gas and the reactant gas, there is provided a plate-like baffle wall having therein a through hole at a portion near the center thereof. The spiral flow is allowed to pass through the through hole so as to be centralized temporarily. The spiral flow then passes through an enlarged section of a flow path downstream of the through hole before being introduced into the catalyst bed.

For the purpose of the present invention, the substance to be decomposed refers to a substance that is subjected to decomposition. It means, for example, the PFC in decomposition of PFC. Further, the reactant gas refers to a gas that is reacted with the substance to be decomposed. It is, for example, water or water and oxygen in hydrolysis of PFC.

In a catalytic exhaust gas decomposition apparatus, it is desirable that the exhaust gas containing therein the substance to be decomposed be mixed together with the reactant gas as uniformly as possible. In addition, when such an exhaust gas decomposition apparatus should be built compact to carry out decomposition processes, it is desirable that the exhaust gas and the reactant gas be heated to a predetermined temperature as quickly as possible. These requirements can be achieved by forming a spiral flow of the exhaust gas and the reactant gas.

When a spiral flow is generated, however, a centrifugal force generally tends to make gas velocity greatest at an internal wall portion of a reaction tower and smaller toward an inner side thereof. The velocity at the internal wall portion of the reaction tower includes, in addition to a vertical component that runs along the direction of gas circulation, a horizontal component that runs at right angles with the direction of gas circulation. The gas at the internal wall portion of the reaction tower therefore flows at a velocity greater than that at a central portion of the reaction tower and in the direction slantwise with respect to a cross section of the catalyst bed. As a result, there is a wider variation in the gas velocity at the inner portion of the reactor than when no spiral flow is generated.

To heat the reactant gas to a predetermined temperature level, it is indeed effective to generate a spiral flow; but, the spiral flow works against obtaining a high decomposition rate in the catalyst bed. To counteract this problem, the baffle wall having therein a through hole at a point near the center thereof is installed between the spiral flow generator and the catalyst bed in the catalytic reaction tower, thereby changing the spiral flow into an ordinary plug flow. This effectively suppresses variations in gas velocity distribution of the reactant gas, allowing the gas to flow into the catalyst bed at a uniform gas velocity.

The baffle wall functions to concentrate the gas flow at the center of the reaction tower. The gas flow, which is temporarily throttled by the through hole provided in the baffle wall at a position near the center thereof, becomes a plug flow having a substantially uniform gas velocity before entering the catalyst bed, and then flows into the catalyst bed. It is therefore desirable that a predetermined distance, though variable depending on operating conditions, be allowed between the baffle wall and the catalyst bed. If it is impractical to allow a sufficient distance due to the size of the apparatus involved, the flow of gas that has flown past the baffle wall digs into the central portion of the catalyst bed. When this happens, the amount of catalyst obtained is not sufficient for the inflow gas velocity. A space velocity (SV) as a reaction condition at the dug portion becomes great, resulting in a low decomposition rate. To prevent the catalyst bed from being dug, it is preferable that a porous plate and a mesh plate be installed on an upper portion of the catalyst for preventing the catalyst from moving. A common arrangement is to sandwich the catalyst bed with the porous plates so as to fix the catalyst in position. It is further desirable that a mesh plate and a woven fabric or a non-woven fabric be installed between the porous plate and the catalyst bed. If there is involved a greater spiral flow component, a plurality of sets of the mesh plate and the woven or non-woven fabric are preferably disposed between the upper porous plate and the catalyst bed. The diameter of an opening in the mesh plate is preferably 10 mm or less. Although the material for the mesh plate and the woven or non-woven fabric is not specified, as long as it offers good heat resistance and corrosion resistance, it is preferably for example alumina.

The baffle wall should preferably be located at a point a given distance away from the surface of the catalyst bed, since the flow of gas is not sufficiently rectified, if the baffle wall is located too close to the catalyst bed. If the mesh plate and the woven or non-woven fabric are placed between the upper porous plate and the catalyst bed, it is desirable that the baffle wall be located at a position 250 to 500 mm away from the catalyst bed. If there are disposed no mesh plate or the woven or non-woven fabric, the baffle wall should preferably be located at a position 600 mm or farther away from the catalyst bed.

The number of through holes provided in the baffle wall may be one or a plurality. The function of the baffle wall concentrates the gas flow temporarily at a portion near the center of the reaction tower and then allows the gas flow to pass through an enlarged flow path downstream thereof to suppress variations in the gas velocity distribution. For this very function, the only requirement is that there is at least one through hole provided at a point near the center, no matter how many there are. To provide a single through hole at the center of the baffle wall, it is preferable that the diameter of the through hole be 50 mm to 100 mm. To provide scores of through holes, for example 30 to 50, at the center of the baffle wall, the diameter of each through hole should preferably be 10 mm to 20 mm.

The exhaust gas decomposition apparatus according to one preferred embodiment of the present invention should preferably be constructed so that the spiral flow generator, the baffle wall, and the catalyst bed are housed in the cylindrical reaction tower. It is also preferable that the reaction tower be an externally heated type, surrounded by a heating furnace like an annular electric furnace. This construction contributes to a compact overall body of the exhaust gas decomposition apparatus that requires a small installation space.

The spiral flow generator, the baffle wall, and the catalyst bed are preferably installed inside the reaction tower, in that order from a top of the reaction tower downward. In addition, the reaction tower should preferably be provided with a discharge port for discharging decomposed gases on a lower portion thereof. This arrangement directs flow of the exhaust gas downward, facilitating a design job when a decomposed gas cleaning tower is to be provided at a later stage downstream of the exhaust gas decomposition apparatus according to the preferred embodiment of the present invention.

It is preferable that the following arrangement be provided so that the spiral flow can be formed in an upper portion inside the reaction tower. Specifically, an inner cylinder is provided at the upper portion inside the reaction tower, thereby introducing the exhaust gas and the reactant gas into a space between the inner wall of the reaction tower and an outer surface of the inner cylinder and making the gas flow spiral along the outer surface of the inner cylinder. To accomplish this, an entrance port for the exhaust gas and the reactant gas should preferably be disposed substantially horizontally and slantwise with respect to the side wall of the reaction tower, thereby allowing the gases to be introduced from an tangential direction with respect to the inner cylinder. The spiral flow may be either clockwise or counterclockwise.

A metal should preferably be used for the material of the inner cylinder. Inconel or Hastelloy may be a preferred material used for the inner cylinder. Use of a metal inner cylinder allows the spiral flow to receive heat transmitted from the inner cylinder, which helps economize on the amount of energy required for warming the reactant gas to the predetermined temperature.

In the exhaust gas decomposition apparatus according to one preferred embodiment of the present invention, it is preferable that a clearance be defined between the inner wall of the reaction tower and the outer surface of the baffle wall. Part of gas that flows downward the baffle wall through that clearance tends to turn around toward the center of the baffle wall. This damps the force of gas flowing from the baffle wall toward the catalyst bed, allowing the gas to be stagnant for a longer period of time. As a result, it is possible to reduce the gas velocity and increase the decomposition rate of the substance to be decomposed, for example, PFC.

It is further preferable that a ring-shaped member be provided on the inside of the catalyst bed or on the inner wall of the reaction tower on a bottom portion of the catalyst bed. When a properly directed exhaust gas flows through the catalyst bed, it tends to flow along an inner wall portion of the reaction tower having less pressure loss. This makes the gas velocity at the inner wall portion greater than that located near the center. The ring-shaped members, if provided inside the catalyst bed and on the bottom portion of the catalyst bed, direct the gas flowing near the inner wall of the reaction tower toward the center of the catalyst bed. This helps make the gas velocity at the inner wall portion slow, thereby suppressing variations in the gas velocity in a radial direction of the reaction tower. A greater effect can be produced from the ring-shaped members provided both on the inside and on the bottom portion of the catalyst bed than from the ring-shaped member provided only on either of these two portions. In addition, a plurality of the ring-shaped members provided inside the catalyst bed produces a greater effect than a single member does.

The exhaust gas decomposition apparatus according to one preferred embodiment of the present invention is highly preferable for decomposing PFC. Typical PFC gases include, for example, $CF_4$, $C_2F_6$, $C_3F_8$, $SF_6$, and $NF_3$. These PFC gases are used in semiconductor and liquid-crystal fields for etching reagents, cleaning agents, and insulation gases. PFC is a global warming gas controlled in terms of atmospheric discharge and therefore must be decomposed.

To decompose PFC, one preferred embodiment of the present invention provides an exhaust gas decomposition apparatus used for decomposition of PFC comprising the following components. The components are specifically: a first scrubber that makes an exhaust gas containing therein PFC in contact with an alkaline aqueous solution to remove gaseous impurities contained in the exhaust gas; a second scrubber that removes solid substances contained in the exhaust gas processed by the first scrubber; a water adding device and an air adding device that add water and air to the exhaust gas processed by the second scrubber; a preheating tower that preheats the exhaust gas to which water and air have been added; a reaction tower that introduces the gas preheated by the preheating tower and lets PFC react with water and air for decomposition; a cooler that cools with water the gas processed by the reaction tower; and, an exhaust gas cleaning tower that removes hydrogen fluoride and other acid components included in the gas cooled by the cooler by cleaning the gas using water or the alkaline aqueous solution. As touched upon earlier, the reaction tower of the exhaust gas decomposition apparatus is provided with the spiral flow generator, the baffle wall having therein a through hole at the center thereof, and the catalyst bed.

For the second scrubber, the following commonly used types may be used: a packed tower, a Venturi scrubber, a jet scrubber, a spray tower, a cyclone scrubber, a cascade tower, a rotary disc type, a water sump turbulent flow type, a bubbling tower, and a tray tower.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

Preferred embodiments according to the present invention will be described.

Embodiment 1

Figure 1:
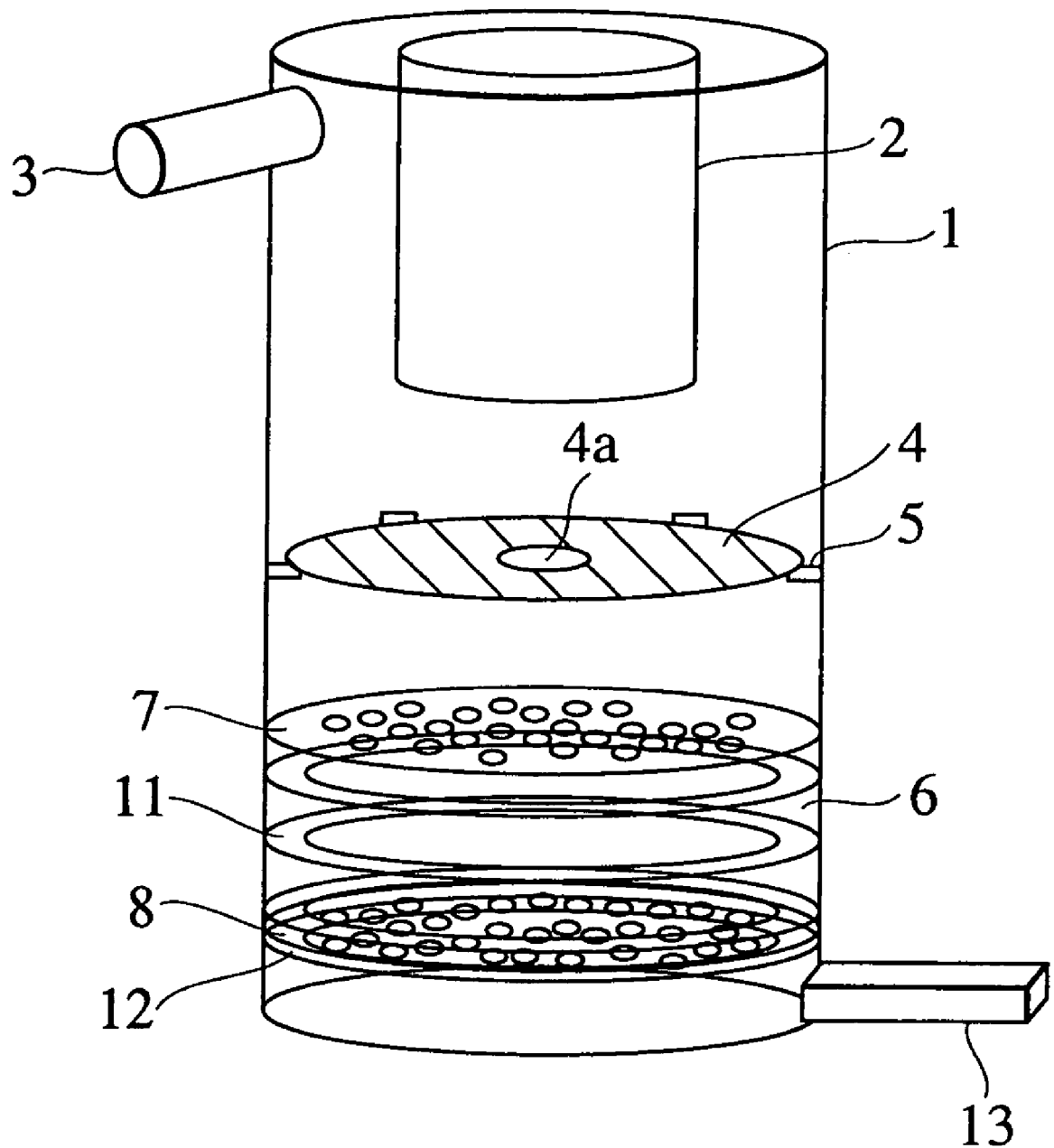
FIG. 1 is a perspective view showing the exhaust gas decomposition apparatus according to one embodiment of the present invention.
Figure 2:
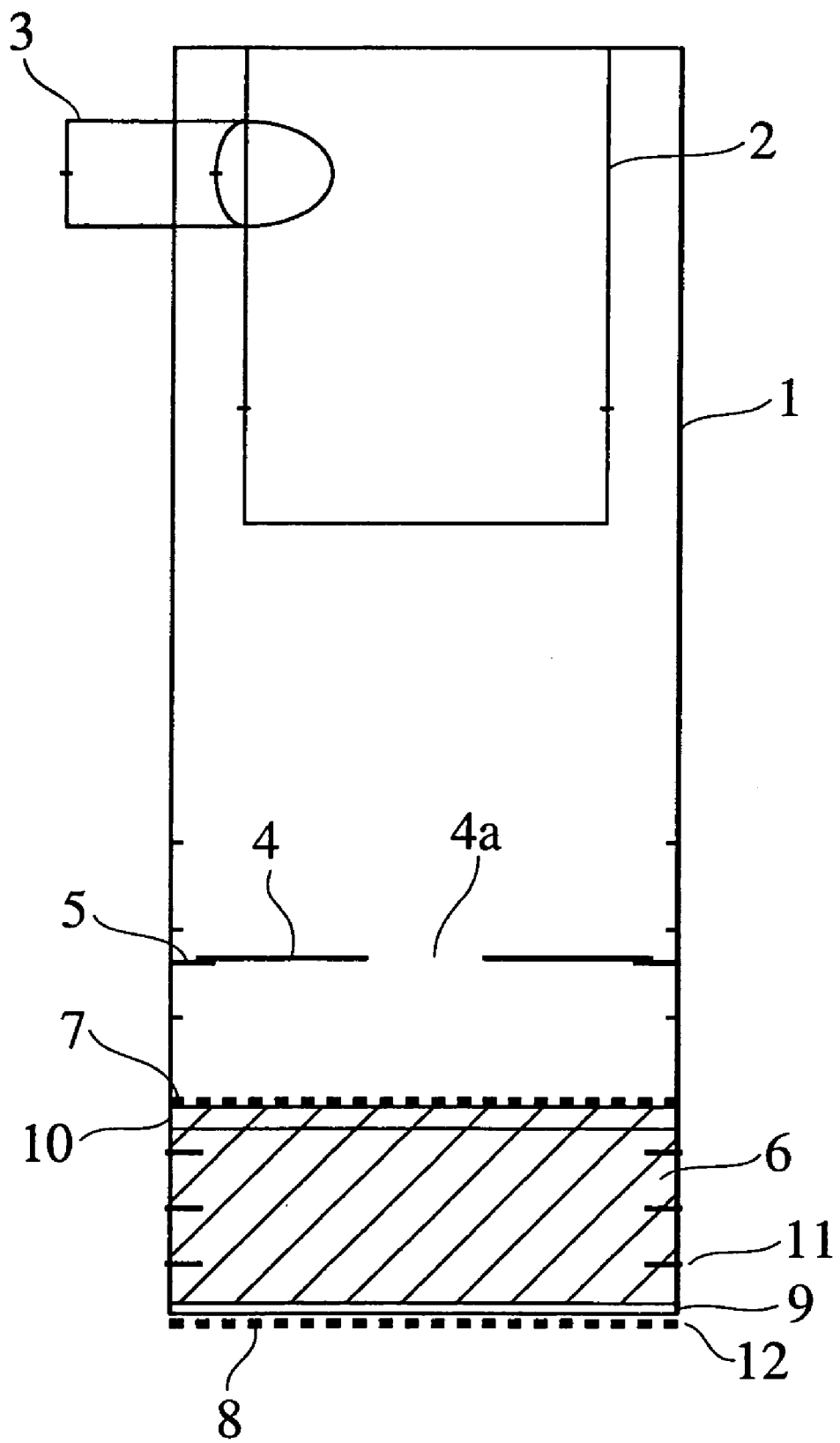
FIG. 2 is a side elevational view showing the exhaust gas decomposition apparatus according to one embodiment of the present invention.

FIGS. 1 and 2 show an exhaust gas decomposition apparatus according to a first preferred embodiment of the present invention, FIG. 1 showing a perspective view and FIG. 2 showing a side elevational view.

The catalytic exhaust gas decomposition apparatus according to the first preferred embodiment of the present invention is provided with a reaction tower 1 and an inner cylinder 2 that is located upward inside the reaction tower 1. There is disposed on an upward portion of a side wall of the reaction tower 1 a gas introduction port 3 for introducing an exhaust gas and a reactant gas. The gas introduction port 3 is attached horizontally to the side wall of the reaction tower 1 and slantwise with respect thereto, instead of being at right angles with the side wall. This specific configuration allows the exhaust gas and the reactant gas introduced through the gas introduction port 3 into the reaction tower 1 to flow through a space between the inner wall of the reaction tower 1 and the inner cylinder 2, thus the exhaust gas and the reactant gas spiraling along a periphery of the inner cylinder 2.

A baffle wall 4 is provided at a substantially central portion in the height direction of the reaction tower 1. The baffle wall 4 is provided with a through hole 4a at around the center thereof. A spiral flow is formed by the gas introduced into the reaction tower and flowing downwardly while spiraling horizontally in the space between the inner wall of the reaction tower 1 and the inner cylinder 2. The through hole 4a in the baffle wall 4 functions to temporarily concentrate this spiral flow at the central portion. The spiral flow then moves past the through hole 4a and flows in a widened flow path before being introduced into the catalyst bed 6. The baffle wall 4 is placed on tabs 5 provided at a plurality of places on the inner wall of the catalytic reaction tower 1. Since there is a clearance provided between the inner wall of the reaction tower 1 and an outer surface of the baffle wall 4, part of the exhaust gas and reactant gas flows through this clearance down under the baffle wall 4.

The catalyst bed 6 is a collective body of catalytic particles. An upper porous plate 7 and a lower porous plate 8 are therefore used to sandwich the catalyst bed 6 to prevent catalysts from moving. A woven fabric 10 made of alumina fibers is placed between the upper porous plate 7 and the catalyst bed 6. Further, there is provided between the catalyst bed 6 and the lower porous plate 8 a mesh plate 9 having a smaller hole diameter than the lower porous plate 8. The mesh plate 9 enhances catalyst drop preventive effect.

Ring-shaped members are provided on the inner wall of the reaction tower 1 and, more precisely, on the inside of the catalyst bed 6 and downwardly the catalyst bed 6. A plurality of ring-shaped members are provided in the catalyst bed. For the purpose of the present invention, the ring-shaped member provided inside the catalyst bed is called an in-layer ring and the ring-shape member provided downwardly the catalyst bed 6 is called a shield ring. Referring to FIG. 2, reference numeral 11 represents the in-layer ring, while reference numeral 12 represents the shield ring. A decomposed gas discharge port 13 for discharging gases decomposed by the catalyst bed is provided on a side wall at a lower portion of the reaction tower 1.

Figure 3:
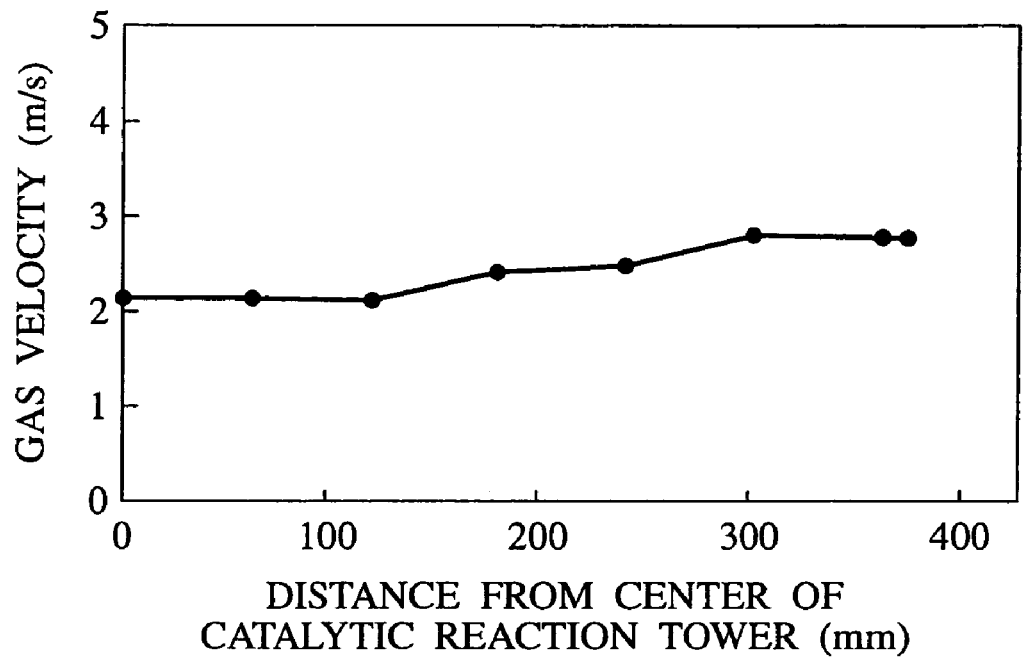
FIG. 3 is a graph showing the relationship between the gas velocity and the distance from the center of the reaction tower.

The graph shown in FIG. 3 shows the results of investigation made into velocity distribution of gases that pass through the baffle wall in an arrangement, in which an inner cylinder with an outside diameter of 612 mm is provided inside a reaction tower with an inside diameter of 850 mm and the baffle wall is disposed downward the inner cylinder. The baffle wall is provided at a central portion thereof with 31 12-mm-diameter through holes with a pitch of 24 mm. FIG. 3 shows the relationship between the gas velocity and the distance from the center of the reaction tower. The gas velocity distribution obtained exhibits a substantially uniform tendency from the center of the reaction tower to a portion near the inner wall.

It is possible to estimate, for example, the decomposition rate of PFC using the space velocity [SV ($h^{-1}$)=reactant gas velocity (liter/h)/amount of catalyst (liters)] at a predetermined reaction temperature. It is therefore possible to calculate an approximate decomposition rate from the gas velocity and the amount of catalyst in the catalytic reaction tower.

Figure 4:
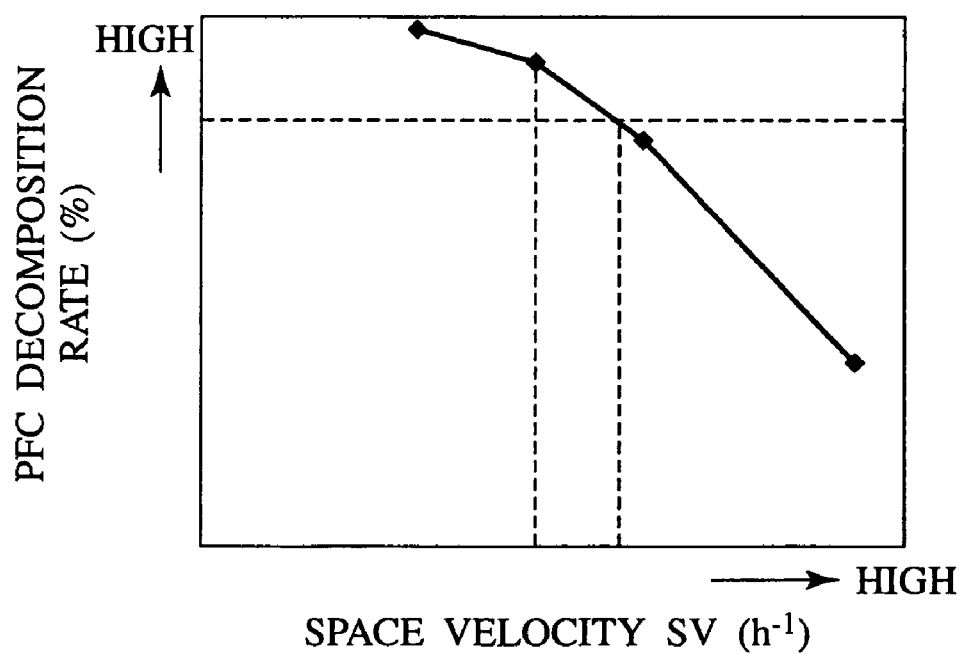
FIG. 4 is a graph showing the relationship between the PFC decomposition rate and gas space velocity.

The graph shown in FIG. 4 depicts a general relationship between the PFC decomposition rate and space velocity. It is known from this graph that the PFC decomposition rate increases as the space velocity becomes smaller. The graph tells that it becomes difficult to obtain a desired decomposition rate when there are variations in the gas velocity distribution. To obtain a consistently high decomposition rate, it is desirable that the gas velocity be made lower and variations in the gas velocity distribution be suppressed as much as feasible. To make the gas velocity low, it is effective to allow an ample distance between the inner cylinder and the baffle wall. It would further be effective to provide a clearance between the inner wall of the reaction tower and the outer surface of the baffle wall so as to allow part of the exhaust gas to flow downward through this clearance.

Figure 5:
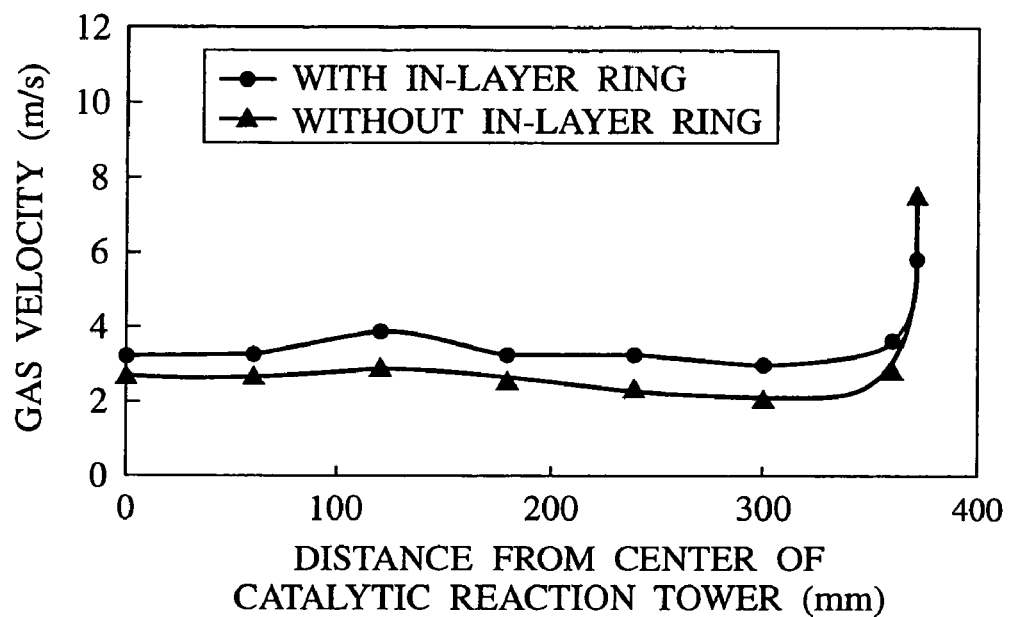
FIG. 5 is a graph showing the relationship between the gas velocity and the distance from the center of the reaction tower.

The graph shown in FIG. 5 shows the results of investigation made into effects produced from providing a ring-shaped member on the inner wall of the reaction tower.

The inside diameter of the reaction tower and the outside diameter of the inner cylinder are the same as those of FIG. 3. The baffle wall has the same construction as that of FIG. 3. The catalyst bed has a layer height of 370 mm. A mesh plate with a mesh pitch of about 1 mm is placed on the catalyst bed. A lower porous plate having therein throughout an entire surface thereof 6-mm-diameter holes placed at a pitch of 12 mm is disposed on the bottom portion of the catalyst bed. The same mesh plate as mentioned earlier is placed between this lower porous plate and the catalyst bed. There is also provided a shield ring on the inner wall of the reaction tower and on the lower portion of the lower porous plate. In this condition, a plurality of in-layer rings are placed on the periphery inside the catalyst bed, namely the inner wall of the reaction tower. These in-layer rings are installed at levels of 0, 100, 200, 300, and 370 mm from the upper portion of the catalyst. Both the in-layer rings and shield ring have the inside diameter of 760 mm. The portion of 45 mm from the inner wall of the reaction tower is therefore designed to be shielded with the ring-shaped members.

Without the in-layer rings, the velocity of the gas that flows near the inner wall of the reaction tower is 7.6 m/s. When in-layer rings are installed, on the other hand, the velocity is 5.6 m/s. This tells that the use of in-layer rings helps make lower the velocity of the gas flowing along the inner wall of the reaction tower. It also tells that the use of in-layer rings helps suppress variations in gas velocity in a radial direction of the reaction tower.

Figure 7:
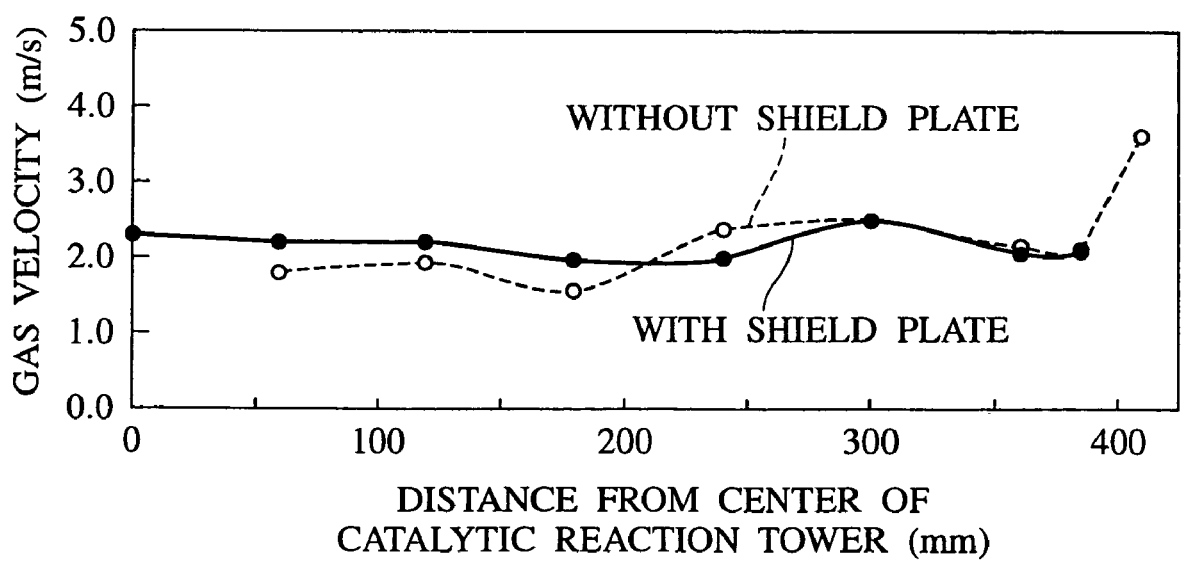
FIG. 7 is a graph showing the relationship between the distance from the center of the catalytic reaction tower and the gas velocity.

FIG. 7 shows the effects produced from the shield plate on the bottom portion of the catalyst bed. FIG. 7 tells that the use of the shield plate eliminates the flow of gases flowing at a high velocity along the inner wall of the reaction tower, contributing to a uniform gas velocity in the radial direction from the center of the reaction tower.

Embodiment 2

Figure 6:
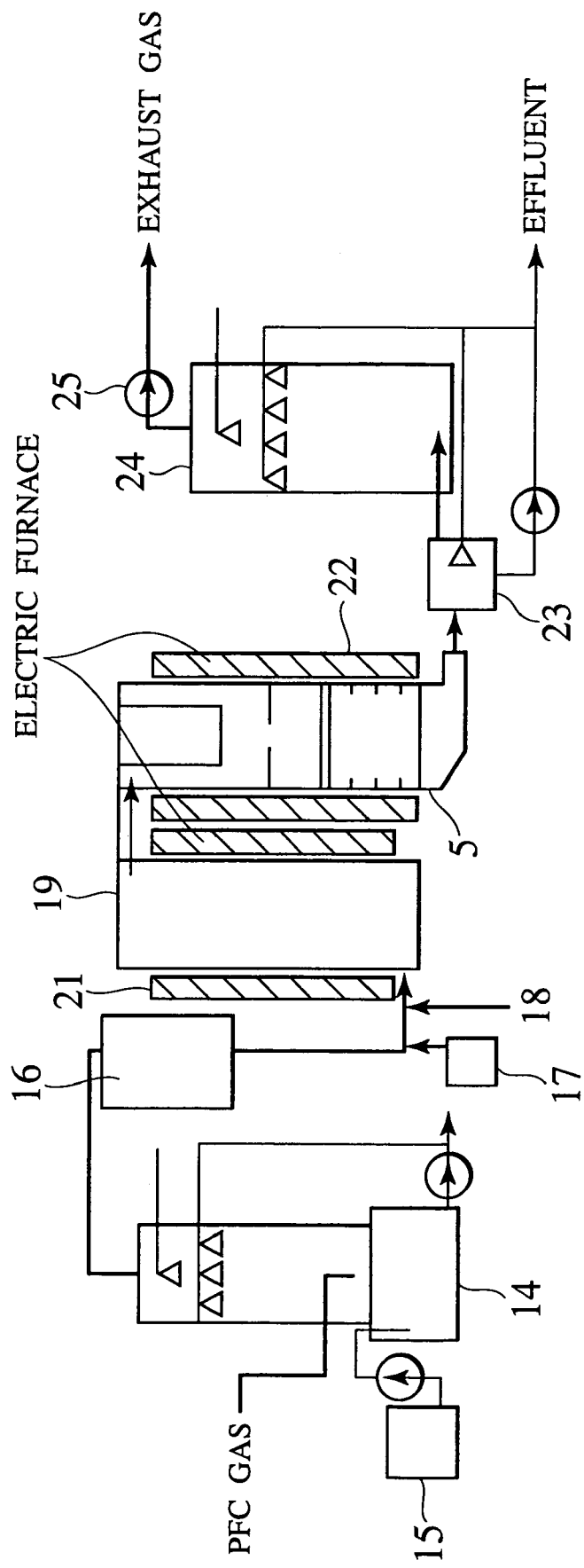
FIG. 6 is a diagram of the exhaust gas decomposition apparatus used for decomposition of PFC according to one embodiment of the present invention.

FIG. 6 shows a diagram of an exhaust gas decomposition apparatus preferably used for decomposition of PFC. Exhaust gases containing therein PFC discharged from a semiconductor plant or a plant using liquid-crystals enter a first scrubber 14, in which HF, $F_2$, HCl, $Cl_2$, HBr, $Br_2$, and other corrosive components and $SiF_4$ and other impurities contained in the exhaust gases are removed therefrom by an alkaline aqueous solution. An alkaline tank 15 supplies the first scrubber 14 with alkaline aqueous solution from time to time when necessary. The exhaust gases containing PFC that have flowed past the first scrubber 14 are then introduced to a second scrubber 16, at which solid substances including $SiO_2$ contained in the exhaust gases are removed. A reaction water evaporator 17 then adds steam to the exhaust gases containing PFC, from which solid substances have been removed by the second scrubber 16. Air 18 is also added to the exhaust gases containing PFC. The exhaust gases containing PFC are then introduced to a preheating tower 19, at which the exhaust gases containing PFC are heated to 500 to 600° C. The exhaust gases containing PFC preheated by the preheating tower 19 are then introduced to a reaction tower 20, at which PFC decomposition processing is carried out. As explained with reference to FIGS. 1 and 2, the reaction tower 20 is provided therein with a spiral flow generator, a baffle wall having therein a through hole at a portion near the center thereof, and a catalyst bed. The preheating tower 19 and the reaction tower 20 are housed, respectively, in annular electric furnaces 21, 22. Through this arrangement, the exhaust gases containing PFC are heated to 700 to 800° C. before entering the catalyst bed of the reaction tower.

Roughly speaking, the following reactions take place to decompose PFC in the catalyst bed of the reaction tower 20, although specific reactions vary depending on the type of PFC.

$CF_4 + 2H_2O \to CO_2 + 4HF$ $C_2F_6 + 3H_2O \to CO + CO_2 + 6HF$ $CHF_3 + H_2O \to CO + 3HF$ $SF_6 + 3H_2O \to SO_3 + 6HF$ $NF_3 + 3/2 H_2O \to 1/2 NO + 1/2 NO_2 + 3HF$

The gas, which has moved past the catalyst bed, is sent to a cooling chamber 23 and cooled down to approximately 70° C. by mainly water. The decomposed gas is then introduced to an exhaust gas cleaning tower 24. In the exhaust gas cleaning tower 24, water or alkaline aqueous solution is sprayed to the gas introduced thereto, thereby removing from the gas hydrogen fluoride and other acid components contained therein. The gas that comes out of the exhaust gas cleaning tower 24 is discharged into the atmosphere through an ejector 25. The aqueous solution that has absorbed acid components is discharged to a wastewater decomposition facility installed in the plant.

In the exhaust gas decomposition apparatus provided with the catalyst bed according to the preferred embodiment of the present invention, it is possible to suppress variations in velocity distribution of the gases introduced to the catalyst bed.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An exhaust gas decomposition method, comprising the steps of:
    forming a spiral flow of a reactant gas and an exhaust gas containing therein a substance to be decomposed;
    rectifying said spiral flow; and
    introducing said spiral flow to a catalyst bed after rectification, and without changing substantially the direction of flow of the rectified spiral flow into the catalyst bed so as to maintain substantially rectification of the spiral flow, to allow said substance to be decomposed to react with said reactant gas;
    wherein said spiral flow is formed within a passage having an inner wall and a baffle plate located in the passage substantially perpendicular to the inner wall, and part of said spiral flow exists at said baffle plate near the inner wall of the passage after rectification,
    wherein said spiral flow is passed through at least one through hole provided at a portion near a center of baffle plate, and then passed through an enlarged section of a flow path downstream of the through hole before being introduced into said catalyst bed.

2. An exhaust gas decomposition method according to claim 1,
    wherein said catalyst bed is housed in a reactive tower having said passage, and a clearance is provided between the baffle plate and the inner wall.

3. An exhaust gas decomposition method according to claim 1,
    wherein the baffle plate is located approximately 250-500 mm from the catalyst bed.

4. An exhaust gas decomposition method, comprising the steps of:
    forming a spiral flow in a passage, said spiral flow being formed of a reactant gas and an exhaust gas containing therein a substance to be decomposed;
    rectifying said spiral flow;
    introducing said spiral flow to a catalyst bed after rectification, and without changing substantially the direction of flow of the rectified spiral flow into the catalyst bed so as to maintain substantially rectification of the spiral flow, to allow said substance to be decomposed to react with said reactant gas; and gathering said spiral flow in a center part in the passage so as to diffuse said gathered spiral flow, wherein said spiral flow is formed within a passage having an inner wall and a baffle plate located in the passage substantially perpendicular to the inner wall, and part of said spiral flow exists at said baffle plate near the inner wall of the passage after rectification;

wherein said spiral flow is passed through at least one through hole provided at a portion near a center of baffle plate, and then passed through an enlarged section of a flow path downstream of the through hole before being introduced into said catalyst bed.

5. An exhaust gas decomposition method according to claim 4, further comprising a second gathering step of gathering said diffused spiral flow.

6. An exhaust gas decomposition method according to claim 5, wherein said second gathering step is performed using two or more rings.

7. An exhaust gas decomposition method according to claim 4, wherein the distribution of the speed of said diffused spiral flow is almost uniform.

8. An exhaust gas decomposition method according to claim 4, wherein the step of rectifying said spiral flow employs a baffle plate disposed within a passage bounded by a wall to which said baffle plate is arranged substantially perpendicularly, and wherein the baffle plate is located approximately 250-500 mm from the catalyst bed.

9. An exhaust gas decomposition method, comprising the steps of:

forming a spiral flow of a reactant gas and an exhaust gas containing therein a substance to be decomposed;

rectifying said spiral flow; and introducing said spiral flow to a catalyst bed after rectification, and without changing substantially the direction of flow of the rectified spiral flow into the catalyst bed so as to maintain substantially rectification of the spiral flow, to allow said substance to be decomposed to react with said reactant gas;

wherein said spiral flow is passed through a through hole provided at a portion near a center of a baffle plate, and then passed through an enlarged section of a flow path downstream of the through hole before being introduced into said catalyst bed, wherein said spiral flow is formed within a passage having an inner wall and a baffle plate located in the passage substantially perpendicular to the inner wall, and part of said spiral flow exists at said baffle plate near the inner wall of the passage after rectification;

wherein said spiral flow is passed through at least one through hole provided at a portion near a center of baffle plate, and then passed through an enlarged section of a flow path downstream of the through hole before being introduced into said catalyst bed;

wherein the baffle plate is located approximately 250-500 mm from the catalyst bed.

* * * * *